United States Patent
Nakagawa

(10) Patent No.: US 6,298,892 B1
(45) Date of Patent: Oct. 9, 2001

(54) PNEUMATIC TIRE WITH SPECIFIED CARCASS PROFILE IN BEAD PORTIONS

(75) Inventor: Emiko Nakagawa, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/469,254

(22) Filed: Dec. 22, 1999

(30) Foreign Application Priority Data

Dec. 22, 1998 (JP) .................................................. 10-365300

(51) Int. Cl.7 ................ B60C 15/00; B60C 9/02

(52) U.S. Cl. .......................... 152/539; 152/548

(58) Field of Search ..................... 152/539, 548, 152/552, 558, 559, 560

(56) References Cited

U.S. PATENT DOCUMENTS 5,772,811 * 6/1998 Ueyoko et al. .................. 152/548 X

* cited by examiner

Primary Examiner—Adrienne C. Johnstone

(57) ABSTRACT

A pneumatic tire comprises a pair of axially spaced bead portions with a bead core, and a carcass comprising a main portion extending from one of the bead cores to the other. In a state that the tire is mounted on a standard rim and inflated to a standard pressure but loaded with no tire load, a carcass line inclination angle $\alpha$ is set in the range of not more than 20 degrees. The carcass line inclination angle $\alpha$ is defined as an angle with respect to the tire radial direction, of a straight line (X) drawn between a first point (P1) and a second point (P2). The first point (P1) is an intersecting point between an axial line (K2) passing a bead heel point, and a tangent to a carcass line at a radial height of the radial center of the bead core. The second point (P2) is a point on the carcass line at a radial height of a flange of the standard rim. The carcass line is a thickness center line of the carcass main portion.

5 Claims, 3 Drawing Sheets

PNEUMATIC TIRE WITH SPECIFIED CARCASS PROFILE IN BEAD PORTIONS

BACKGROUND OF THE INVENTION

The present invention relates to a pneumatic tire having an improved carcass profile in the bead portions capable of improving the steering stability, road noise and the like.

Recently, in order to solve an environmental problem, there is a strong demand for tires capable of decreasing the fuel consumption of automobiles. Therefore, it is taken as a countermeasure therefor to reduce the tire weight by decreasing the number of reinforcing cord layers and/or the thickness, size or volume of rubber components. In such countermeasure, however, it is almost inevitable that the tire rigidity, especially lateral stiffness is decreased. Accordingly, the cornering power decreases and as a result, it is difficult to improve the steering stability.

It is therefore, an object of the present invention to provide a pneumatic tire in which the lateral stiffness can be improved without providing additional reinforcing layers and without increasing the sizes of the existing reinforcing layers and rubber components so as not increase the tire weight.

According to the present invention, a pneumatic tire comprises a pair of axially spaced bead portions with a bead core therein, and a carcass comprising a main portion extending from one of the bead cores to the other, wherein in a state that the tire is mounted on a standard rim and inflated to a standard pressure but loaded with no tire load, a carcass line inclination angle $\alpha$ is not more than 20 degrees, wherein the carcass line inclination angle $\alpha$ is defined as an angle with respect to the tire radial direction, of a straight line (X) drawn between a first point (P1) and a second point (P2), the carcass line is a thickness center line of the carcass main portion, the first point (P1) is an intersecting point between an axial line (K2) passing a bead heel point and a tangent to the carcass line at a radial height of the radial center of the bead core, and the second point (P2) is a point on the carcass line at a radial height of a flange of the standard rim.

BRIEF DESCRIPTION OF THE DRAWINGS

An embodiment of the present invention will now be described in detail in conjunction with the accompanying drawings.

DETAILED DESCRIPTION OF THE INVENTION

Figure 1:
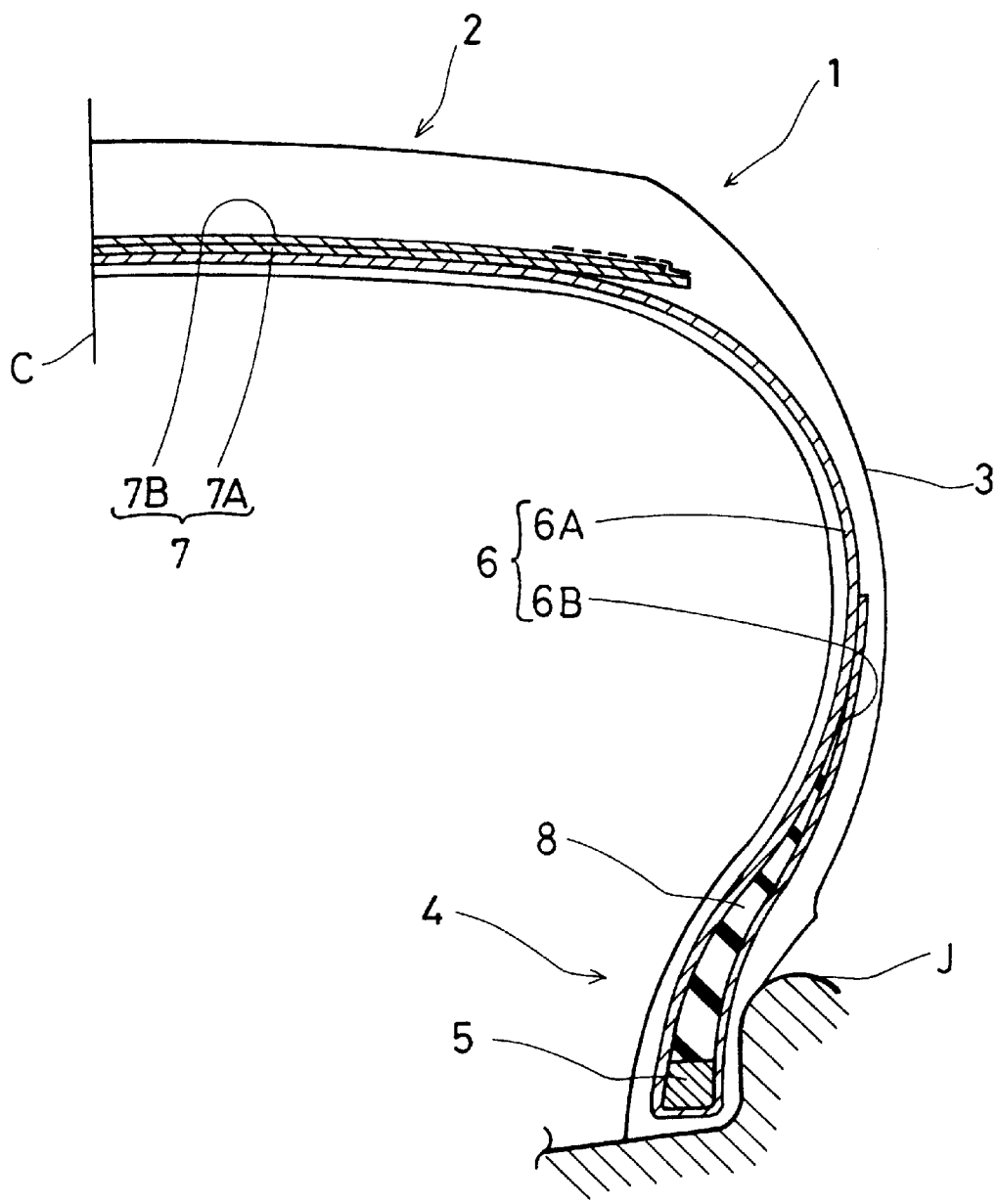
FIG. 1 is a cross sectional view of an embodiment of the present invention.

In the drawings, tire 1 according to the present invention has a tread portion 2, a pair of sidewall portions 3, and a pair of bead portions 4. In this embodiment, the pneumatic tire 1 is a radial tire for passenger cars.

Figure 2:
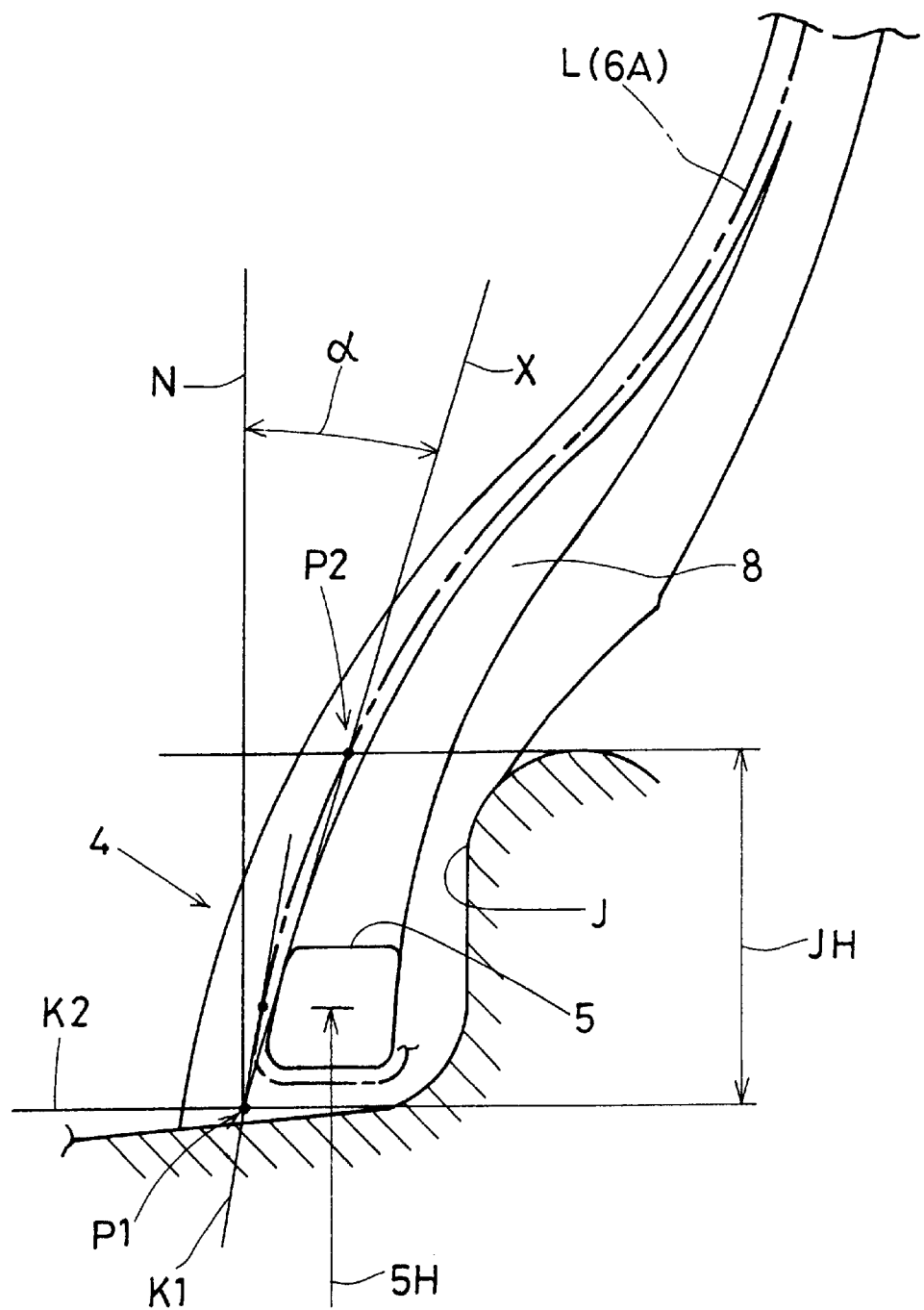
FIG. 2 is an enlarged cross sectional view of a bead portion of the tire under a normally inflated unloaded condition.

FIG. 1 and FIG. 2 show the tire 1 under a normally inflated unloaded state in which the tire is mounted on a standard rim J and inflated to a standard pressure but loaded with no tire load.

Here, the standard rim is the "standard rim" specified in JATMA, the "Measuring Rim" in ETRTO, the "Design Rim" in TRA or the like. The standard pressure is the maximum air pressures in JATMA, the "Inflation Pressure" in ETRTO, the maximum pressure given in the "Tire Load Limits at Various Cold Inflation Pressures" table in TRA or the like. Further, a standard load is the "maximum load capacity" in JATMA, the "Load Capacity" in ETRTO, the maximum value given in the above-mentioned table in TRA or the like. In case of passenger car tires, however, as the standard pressure, 180 kPa is used.

The tire 1 is reinforced by a bead core 5 disposed in each of the bead portions 4, a carcass 6 extending between the bead portions 4 through the tread portion 2 and sidewall portions 3, and a belt 7 disposed radially outside the carcass 6 in the tread portion 2.

The belt comprises a breaker 7 and optionally a band.

The breaker 7 comprises at least two cross plies, in this embodiment only two cross plies 7A and 7B of cords laid at an angle of not more than 30 degrees but more than 0 degree with respect to the tire equator C. For the breaker cords, metalic cords, e.g. steel and the like or high modulus organic fiber cords, e.g. aromatic polyamide and the like having a high elastic modulus like steel are preferably used.

The band is formed by spirally winding at least one cord or winding a strip of rubberized parallel cords, wherein the cord angle is substantially zero with respect to the tire equator C. In FIG. 1, a pair of edge bands are disposed on the radially outside of the breaker in its axial edge portions.

The bead core 5 in this embodiment is formed by winding a plurality of wires, which are arranged side by side into a tape-like formation, into plural layers. The bead core 5 has a substantially rectangular cross sectional shape of which the radially inside becomes substantially parallel with the bead seat of the standard rim. It is also possible to form the bead core 5 by winding a single wire. Further, various shapes, e.g. round, hexagon, pentagon and the like may be also used.

The carcass 6 comprises a ply of cords arranged radially at an angle of from 75 to 90 degrees with respect to the tire equator C, extending between the bead portions 4 through the tread portion 2 and sidewall portions 3, and turned up around the bead core 5 in each of the bead portions 4 from the axially inside to the outside of the tire to form a pair of turned up portions 6B and a main portion 6A therebetween. For the carcass cords, organic fiber cords, e.g. polyester, nylon, rayon, aromatic polyamide and the like are suitably used. In this embodiment, the carcass 6 consists of a single ply and the turned up portions 6B are extended to near the maximum tire section width position.

Each of the bead portions 4 is provided between the turned up portions 6B and main portion 6A with a bead apex 8. The bead apex 8 is made of a hard rubber having a JIS-A hardness of from 75 to 97 degrees and extends radially outwardly from the bead core 5 while tapering radially outwards.

To begin with, a "carcass line" L is defined as the thickness center line of the carcass main portion 6A as shown in FIG. 2. Further, under the normally inflated unloaded state, a "carcass line inclination angle $\alpha$" is defined as an inclination angle with respect to the radial direction of the tire, of a straight line X drawn between a first point P1 and second point P2. The first point P1 is an intersecting point between an axial line K2 passing a bead heel point 4A and a tangent K1 to the carcass line L at a radial height H5 of the radial center of the bead core 5. The second point P2 is a point on the carcass line L at the same radial height as a flange J of the standard rim J. The bead heel point 4A is defined as a point on the outer surface of the bead portion at which this outer surface intersects the bead base line or an axial line drawn at a radial position corresponding to the rim diameter of the standard rim J. Accordingly, the axial line K2 under the normally inflated unloaded state is equal to the bead base line.

In the present invention, the carcass line inclination angle α is set in the range of not more than 20 degrees.

Figure 3:
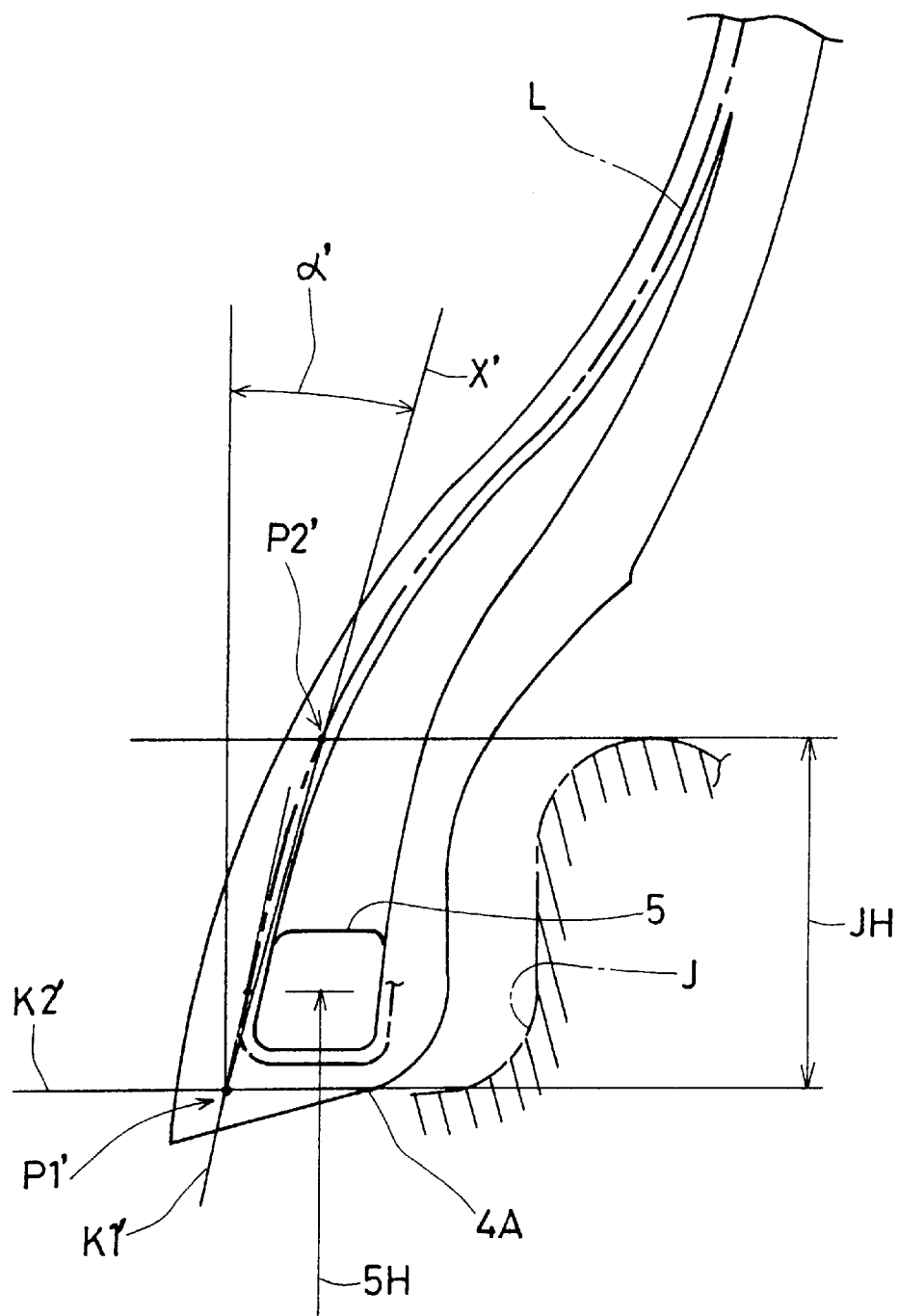
FIG. 3 is an enlarged cross sectional view of the same bead portion when the tire is not mounted on a rim.

Further, as shown in FIG. 3, in a free state in which the tire 1 is not mounted on a rim and held vertically, a "carcass line inclination angle α'" is similarly defined as an inclination angle with respect to the radial direction of the tire, of a straight line X' drawn between a first point P1' and second point P2'. The first point P1' is an intersecting point between an axial line K2' passing the above-mentioned bead heel point 4A and a tangent K1' to the carcass line L at the radial height H5 of the radial center of the bead core 5. The second point P2' is a point on the carcass line L at the same radial height as the flange J of the standard rim J.

In this embodiment, the carcass line inclination angle α' is also set in the range of not more than 20 degrees.

Preferably, the difference (α–α') is set in the range of not more than 10 degrees.

If the carcass line inclination angle α exceeds 20 degrees, during vulcanizing the tire, the elongation of the carcass from the bead portion to the belt edge becomes uneven, that is, the carcass cord tension becomes uneven. As a result, the residual tension in the finished tire becomes uneven.

In the present invention, however, by setting the carcass line inclination angle α not more than 20 degrees, the carcass cord tension is evened and thereby the lateral stiffness of the tire can be increased.

Comparison Tests

Passenger radial tires having the structure shown in FIG. 1 were made and tested for the lateral spring constant, cornering power, steering stability, ride comfort and road noise.

The tire specifications and test results are shown in Table 1.

The carcass line inclination angles α and α' were measured using a CT scanner.

1) Lateral Spring Constant and Cornering Power

Using an indoor tire tester, the lateral spring constant and cornering power were measured under a vertical tire load of 4.41 kN. The results are indicated by an index based on Ref. 1 being 100.

2) Steering Stability and Ride Comfort

A Japanese 2500 cc FR passenger car provided on all the four wheel with test tires was run in a test course, and the test driver evaluated the steering stability and ride comfort into ten ranks. The higher the rank, the better the performance.

3) Road Noise

Running the above-mentioned passenger car on a rough asphalt road at a speed of 50 km/h, noise in dB(A) was measured with a microphone set near the driver's right ear. The results are indicated as a difference from Ref. 1.

TABLE 1

| Tire | Ex. 1 | Ex. 2 | Ex. 3 | Ref. 1 | Ref. 2 | Ref. 3 |
| --- | --- | --- | --- | --- | --- | --- |
| Carcass Line Inclination angle | | | | | | |
| α(deg.) | 19 | 17 | 16 | 25 | 27 | 29 |
| α' (deg.) | 10 | 10 | 9 | 13 | 13 | 15 |
| α–α' (deg.) | 9 | 7 | 7 | 12 | 14 | 14 |
| Lateral spring constant | 106 | 108 | 109 | 100 | 99 | 97 |
| Cornering power | 105 | 110 | 112 | 100 | 98 | 98 |
| Steering stability | 7 | 7 | 8 | 6 | 5 | 5 |
| Ride comfort | 6 | 6 | 7 | 6 | 6 | 6 |
| Road noise | –0.5 | –0.7 | –1.1 | 0 | 0.3 | 0.9 |

Tire size: 195/65R15 Rim size: 15 × 6-JJ

As described above, in the tires according to the present invention, the lateral spring constant and cornaering power increase and the steering stability can be improved without using additional reinforcing layers which increase the tire weight. The ride comfort is maintained or improved. Further, the road noise can be improved.

What is claimed is:

1. A pneumatic tire comprising
   a pair of axially spaced bead portions with a bead core therein,
   a carcass comprising a main portion extending from one of the bead cores to the other, through a tread portion, wherein
   in a state that the tire is mounted on a standard rim and inflated to a standard pressure but loaded with no tire load, a carcass line inclination angle α is not more than 20 degrees,
   the carcass line inclination angle α defined as an angle with respect to the tire radial direction, of a straight line (X) drawn between a first point (P1) and a second point (P2),
   the first point (P1) being an intersecting point between an axial line (K2) passing a bead heel point (4A), and a tangent (K1) to a carcass line (L) at a radial height of the radial center of the bead core,
   the second point (P2) being a point on the carcass line (L) at a radial height of a flange of the standard rim,
   the carcass line (L) being a thickness center line of the carcass main portion.

2. The pneumatic tire according to claim 1, wherein
   in a free state that the tire is not mounted on a rim, a carcass line inclination angle α' is not more than 20 degrees,
   the carcass line inclination angle α' defined as an angle with respect to the tire radial direction, of a straight line (X') drawn between a first point (P1') and a second point (P2'),
   the first point (P1') being an intersecting point between an axial line (K2') passing said bead heel point (4A), and a tangent (K1') to the carcass line (L) at the radial height of the radial center of the bead core,
   the second point (P2') being a point on the carcass line (L) at the radial height of the flange of the standard rim.

3. The pneumatic tire according to claim 2, wherein
   said carcass consists of a single ply of cords extending between the bead portions and turned up around the bead core in each bead portion from the inside of the outside of the tire so as to form a pair of turned up portions and said main portion therebetween.

4. The pneumatic tire according to claim 1, wherein said carcass consists of a single ply of cords extending between the bead portions and turned up around the bead core in each bead portion from the inside to the outside of the tire so as to form a pair of turned up portions and said main portion therebetween.

5. The pneumatic tire according to claim 4, wherein said tread portion is provided radially outside the carcass with a belt, said belt consists of two cross plies of parallel cords.

* * * * *